C. T. ALLCUTT.
METHOD OF MOLDING HOLLOW BODIES.
APPLICATION FILED OCT. 8, 1917.

1,343,191.

Patented June 15, 1920.

WITNESSES:
Olen E. Bee
Elmer V Griggs

INVENTOR
Chester T. Allcutt.
BY
Wesley G Carr
ATTORNEY

UNITED STATES PATENT OFFICE.

CHESTER T. ALLCUTT, OF WILKINSBURG, PENNSYLVANIA, ASSIGNOR TO WESTINGHOUSE ELECTRIC AND MANUFACTURING COMPANY, A CORPORATION OF PENNSYLVANIA.

METHOD OF MOLDING HOLLOW BODIES.

1,343,191. Specification of Letters Patent. Patented June 15, 1920.

Application filed October 8, 1917. Serial No. 195,262.

*To all whom it may concern:*

Be it known that I, CHESTER T. ALLCUTT, a citizen of the United States, and a resident of Wilkinsburg, in the county of Allegheny and State of Pennsylvania, have invented a new and useful Improvement in Methods of Molding Hollow Bodies, of which the following is a specification.

My invention relates to a method of molding hollow bodies and it has special relation to methods of molding such materials as fabrics impregnated with phenolic condensation products.

An object of my invention is to provide a molding core which may be readily removed from a molded hollow body.

Another object of my invention is to provide a core which may exert pressure upon the material being molded.

A further object of my invention is to provide a method of molding hollow bodies in which any desired external contour may be obtained while forming pressure is applied from within the body.

A still further object of my invention is to provide a mold having means to simultaneously heat the body being molded and to exert a molding pressure on the body.

In the manufacture of hollow bodies, by molding fabrics impregnated with phenolic condensation products or similar molding materials, it is desirable that a core be provided upon which the body to be molded may be shaped. Since it is frequently of importance that the external surface of a molding device should be smooth and of a proper contour, it is highly desirable that the molding pressure be so applied as to avoid deformation of this surface. When heat must be applied, as is usual in the molding of such material under pressure, it is desirable to subject the material to heat along as great a portion of its surface as is possible. My invention provides for these various requirements in a simple but effective manner.

Figure 1:
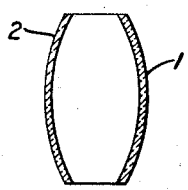
Figure 2:
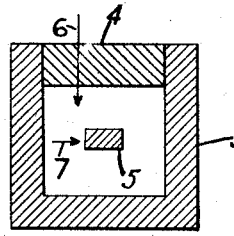
Figure 3:
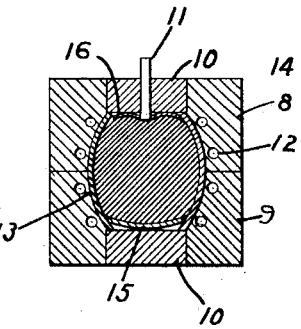
Figure 4:
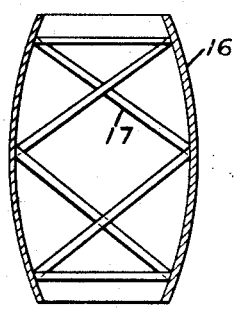
Figure 5:
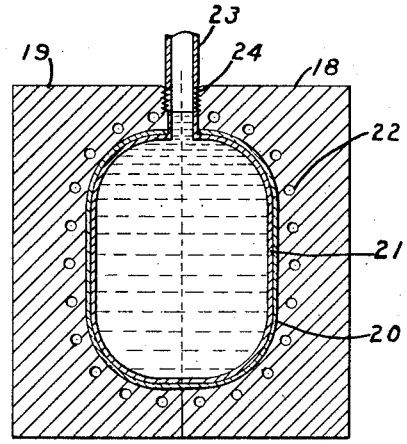
Figure 6:
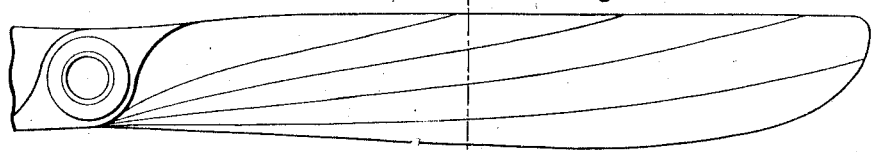
Figure 7:
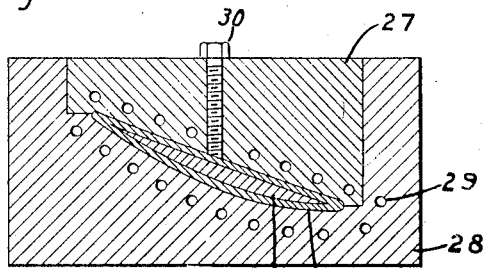

In the drawing, Figure 1 is a sectional view of a hollow body; Fig. 2 is a diagrammatic view illustrating the direction of internal forces in an ordinary mold; Fig. 3 is a sectional view of a mold and core constructed according to my invention. Fig. 4 is a sectional view of a modified form of core; Fig. 5 is a sectional view of modified form of mold; Fig. 6 is an elevational view of a portion of an aeroplane propeller; and Fig. 7 is a sectional view taken on line VII—VII of Fig. 6.

Referring to Fig. 1, member 1 is a hollow tubular body having tapering or constricted end portions 2. Tubular member 1 is formed roughly by winding or wrapping sheets or strips of impregnated fabric, preferably duck impregnated with bakelite or other phenolic condensation products, upon a suitably shaped core. It is to be understood that various other fabrics and impregnating materials may be used. After the rough forming, the tubular member is placed in a mold and subjected to heat and pressure sufficient to mold it into an integral structure.

In Fig. 2, a mold member 3, having a pressure applying member 4 and a core 5, is shown diagrammatically. The hollow body being molded receives core 5 and is placed in mold 3. Pressure is then applied by means of member 4 in the direction of arrow 6. This sets up a pressure in the entire cross-section of the molding material in the direction of arrow 6. Substantially no pressure is exerted upon the molding material in the direction of arrow 7. It is obvious that the molded body will not have as great strength in the latter direction as in the former.

In Fig. 3, which shows my invention applied to the production of a tubular body, such as member 1, a mold is provided consisting of two separable parts 8 and 9 recessed according to the desired external contour of the molded body. Each part of the mold has a recess at the end closed by a plug 10, in any desired manner, and the upper plug 10 has a central aperture in which a plunger or piston 11 closely fits. Parts 8 and 9 are provided with tubular ducts 12 in which heating appliances such as steam pipes or electrical heating resistors may be disposed. At 13 is shown a core member preferably of metallic alloy having a low-temperature melting point which may be below the molding temperature of fabric impregnated with phenolic condensation products. An example of a metallic alloy melting below the molding temperature is a composition comprising two parts of bismuth, one part tin and one part lead, this alloy melting at about 98° C.

In carrying out my invention according to this method, bakelized duck is wrapped or wound upon the solid core 13, as shown at 14. Cup washers 15 and 16 are placed at the ends of core 13, which, with this covering 14 of duck and the washers, is placed in mold member 9. Member 8 is then put in place and clamped or otherwise securely fastened to member 9. Heat is applied by means of any suitable heating device placed in ducts 12. The plunger 11 is inserted in the aperture through plug 10 and passes through the corresponding alined central aperture in cup washer 16 into contact with core 13. A force is applied to plunger 11 tending to drive it into the core. The core becomes heated and is melted at the molding temperature of the impregnated duck. The plunger 11 acts to transmit pressure to the molten core which, in turn, exerts a uniform pressure over the entire inner surface of the molding material in a direction normal to the surface. The cup washers serve to prevent leakage of the molten metal around the ends of the molded material.

After the desired heat and pressure treatment has been completed, the fluid core may be allowed to escape by removal of plunger 11 or the plug 10.

In some cases, a fluid, such as mercury, or even sand, may be employed as the pressure-distributing agency for each molding core. A metallic liquid is particularly desirable, however, because of its good thermal conductivity.

In order to provide a frame upon which the unmolded body may be roughly shaped and also to provide a container to prevent the fluid from entering into the unmolded material and perhaps weakening it at interstices that may occur, it is desirable to provide a core shell such as is shown at 16 in Fig. 4. The core shell 16 may be supported internally by any desired system of interior reinforcing braces 17 during the rough molding operation and is preferably of very thin material in order to readily transmit the pressure from the fluid within when in the mold. The braces may be removable and the core shell may be collapsible or a skeleton framework, or the core braces may be designed to remain as a permanent support for the completed body. The molding operation is, in this instance, substantially the same as that described in connection with the device of Fig. 3 except that the core shell is filled with fluid material after it is placed in the mold. In some instances, the shell may expand sufficiently and in other cases it may be designed to split or yield during the molding operation.

Fig. 5 shows a further modification in which the core shell is particularly designed to prevent leakage of its contained fluid. The mold consists of two members 18 and 19 which are provided with heating ducts 22 and coöperating threaded recesses 24 into which a pipe 23 for supplying fluid is connected. The impregnated material 20 formed about core 21 is placed in the mold and pressure is applied to the fluid by a pump, or like device, connected to pipe 23. It is possible to preheat the core fluid and thus to greatly expedite the process.

Figs. 6 and 7 illustrate the manner of making an aeroplane propeller according to my invention. A hollow core member 25 of fusible metal, which may have a melting point above the molding temperature of the molding material, is covered with the impregnated molding material, as at 26, and is then placed in a mold consisting of two parts 27 and 28 each of which is provided with heating ducts 29. Upper member 27 has an internally threaded opening receiving a plug 30 having an interior end face shaped to lie flush with the interior surface of member 27.

The molding operation is carried out by simultaneous application of heat and pressure to the mass being molded, the fusible core 25 remaining solid at the molding temperature when the molding operation is completed, the molded propeller is raised to a temperature at which the fusible core 25 melts, and a small opening is made in the propeller to permit the fluid core to escape. The application of heat to melt the core may occur either with the propeller in the mold or after it has been removed from the mold. The opening receiving plug 30 is provided to permit a tap hole to be made in the propeller while it is still in the mold.

Obviously, the core 25 might be preheated to a point below its melting temperature before being covered with the molding material and such preheating would greatly expedite the molding operation.

Obviously, many modifications of the process described might be made by one skilled in the art without exceeding the limitations of my invention which is not to be restricted except as indicated in the appended claims.

I claim as my invention:

1. A method of molding hollow bodies that comprises forming the body about a core having a relatively low fusing point, fusing the core and applying pressure thereto.

2. A method of molding hollow bodies that comprises forming the body of material impregnated with a binder about a core having a relatively low fusing point, disposing the formed body and its core in a mold, applying heat to fuse the core and harden the binder and applying pressure to the fused core to compact the material forming the body.

3. A method of molding hollow bodies that comprises superimposing layers of sheet material impregnated with a phenolic condensation product about a core having a relatively low fusing point to form the desired body, disposing the body and inclosed core in a mold and applying heat and pressure simultaneously to the core.

4. A method of molding hollow bodies that comprises superimposing layers of sheet material impregnated with a phenolic condensation product about a core, having a relatively low fusing point, to form the desired body, disposing the body and inclosed core in the mold, fusing the core and applying fluid pressure thereto.

5. A method of molding hollow bodies that comprises superimposing layers of fibrous material impregnated with a binder about a core having a low fusing point, disposing the assembled body in a mold, fusing the core and applying pressure thereto.

6. A method of molding hollow bodies that comprises superimposing layers of fibrous material impregnated with a phenolic condensation product about a core having a low fusing point, disposing the assembled body in a mold, fusing the core and applying pressure thereto.

In testimony whereof, I have hereunto subscribed my name this 29th day of Sept., 1917.

CHESTER T. ALLCUTT.